United States Patent
Rahman et al.

(10) Patent No.: US 6,700,823 B1
(45) Date of Patent: Mar. 2, 2004

(54) PROGRAMMABLE COMMON MODE TERMINATION FOR INPUT/OUTPUT CIRCUITS

(75) Inventors: Arifur Rahman, Yonkers, NY (US); Harold Scholz, Allentown, PA (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 0 days.

(21) Appl. No.: 10/283,765

(22) Filed: Oct. 30, 2002

(51) Int. Cl.[7] .............................................. G11C 16/04
(52) U.S. Cl. ............. 365/189.05; 365/154; 365/189.02; 365/198; 365/230.03; 365/230.08
(58) Field of Search ...................... 365/189.05, 189.02, 365/154, 198, 230.03, 230.08

(56) References Cited

U.S. PATENT DOCUMENTS 5,631,866 A * 5/1997 Oka et al. ............... 365/189.05
5,917,758 A * 6/1999 Keeth .................... 365/189.05
6,577,164 B2 * 6/2003 Tomita ........................ 326/86

OTHER PUBLICATIONS

Hirad Samavati et al., "Fractal Capacitor" IEEE Journal of Solid–State Circuits, vol. 33, No. 12, Dec. 1998, pp. 2035–2041.
Andrea Boni et al., "LVDSI I/O Interface for Gb/s–per–Pin Operation in 0.35$\mu$m CMOS", IEEE Journal of Solid–State Circuits, vol. 36, No. 4, Apr. 2001, pp. 706–711.

* cited by examiner

Primary Examiner—Michael S. Lebentritt
Assistant Examiner—Pho M. Luu
(74) Attorney, Agent, or Firm—MacPherson Kwok; Chen & Heid LLP; Greg J. Michelson

(57) ABSTRACT

Systems and methods provide common mode termination for input/output circuits. For example, common mode termination may be provided to a bank of input/output circuits by programmably coupling a bus to each pair of input/output circuits. The bus provides a path to ground for common mode signals through a capacitor or, alternatively, the bus may be designed to provide or assist in providing the necessary capacitance.

22 Claims, 4 Drawing Sheets

PROGRAMMABLE COMMON MODE TERMINATION FOR INPUT/OUTPUT CIRCUITS

BACKGROUND

1. Technical Field

The present invention relates generally to electrical circuits and, more particularly, to input/output circuits.

2. Related Art

High-speed differential signaling offers many advantages, such as low noise and low power while providing a robust and high-speed data transmission. Differential signaling differs from other types of signaling methods in that, instead of designating a precise voltage level for a logical one or a logical zero, differential signaling specifies a voltage differential (e.g., a positive or a negative voltage drop across a resistive load). One type of high-speed differential signaling is referred to as low voltage differential signaling (LVDS), which exists in many different forms (e.g., such as described in IEEE standard 1596.3 and HyperTransport specifications) due to its deployment across market segments for numerous applications.

Typically, high-speed differential input/output circuits (also referred to as input/output buffers, receiver/transmitter circuits, or receiver/driver circuits) require differential mode termination (e.g., the resistive load) to match the differential impedance of the transmission medium (or channel). The transmission medium (e.g., printed-circuit board traces, backplanes, a differential wire pair, or cables) couples the output circuit to the input circuit and provides a path along which the intended information travels.

Because the receivers only respond to differential voltages, common mode modulations are generally rejected by the receivers. However, common mode signals may pose certain problems with differential signaling systems. For example, the common mode signals, if not terminated, may consume a large portion of a receiver's finite common mode voltage range or, if the common mode signal is driven into resonance, exceed the common mode range of the receiver. Furthermore, a certain portion of the common mode signal may also be transformed into a differential signal due to, for example, inequalities in line impedance or loading of the transmission channel. Consequently, common mode signals may interfere with or degrade the communication of the desired information. As a result, it is desirable to provide systems and methods for providing a common mode termination near the input circuits or output circuits to dampen or terminate common mode signals.

BRIEF SUMMARY

Systems and methods are disclosed herein to provide a common mode termination for input/output circuits. For example, in accordance with an embodiment of the present invention, a common mode termination is provided for each input circuit and each output circuit within a bank of input/output circuits (i.e., a number of input/output circuits). The common mode termination may be programmable to couple a common mode terminal for each input/output circuit to ground using an off-chip capacitor or an on-chip capacitor. The common mode termination for each input circuit and each output circuit may be programmably coupled through a corresponding common bus. Furthermore, each common bus may be designed to function as on-chip capacitance.

More specifically, in accordance with one embodiment of the present invention, an input/output circuit bank includes a plurality of input circuits each having input leads adapted to couple to a corresponding transmission channel; a plurality of output circuits, with each of the output circuits coupled to the input leads of a corresponding one of the input circuits to share the transmission channel; a plurality of resistor pairs, each of the resistor pairs coupled across the input leads of a corresponding one of the input circuits; a common mode node coupled to each of the resistor pairs; and a bus coupled to the common mode nodes and adapted to provide a common mode termination for the input circuits.

In accordance with another embodiment of the present invention, a method of providing a common mode termination for a bank of input/output circuits includes providing a load across input leads of each of the input circuits within the bank; inserting a common mode node between the input leads of each of the input circuits within the bank; and coupling the common mode node for each of the input circuits to a bus which provides a common mode termination path for common mode signals associated with the input circuits.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

The preferred embodiments of the present invention and their advantages are best understood by referring to the detailed description that follows. It should be appreciated that like reference numerals are used to identify like elements illustrated in one or more of the figures.

DETAILED DESCRIPTION

Figure 1:
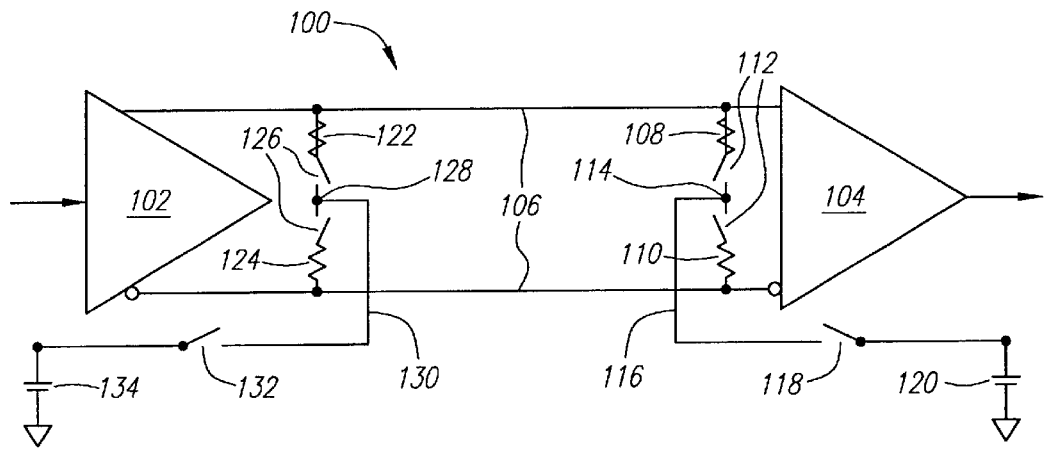
FIG. 1 shows a circuit schematic illustrating a differential signaling system in accordance with an embodiment of the present invention.

FIG. 1 shows a circuit schematic illustrating a differential signaling (DS) system 100 in accordance with an embodiment of the present invention. DS system 100, which may represent for example a low voltage differential signaling (LVDS) system, includes a driver 102 and a receiver 104.

Driver 102 and receiver 104 are generally located on separate chips, boards, or devices and coupled through lines 106 (e.g., a wire pair, a differential wire pair, two printed circuit board traces, or a balanced cable). Resistors 108 and 110 are positioned to serve as a load (i.e., differential mode termination) near receiver 104 and across lines 106. Switches 112 are used to connect or disconnect resistors 108 and 110 across lines 106. For example, switches 112 may be programmable switches by using a transistor controlled by a memory cell output signal or other control signal (not shown).

Resistors 108 and 110 (also referred to as load resistors) may each have, for example, a resistance of 50 Ω or some other desired value, depending upon the application, such as to match the characteristic impedance of the transmission line. A line 116 is connected between resistor 108 and resistor 110 at a common mode node 114 to provide common mode termination by coupling common mode node 114 to ground via a capacitor 120. Line 116 may provide programmable common mode termination by employing a switch 118 (e.g., a transistor controlled by a memory cell output signal or other control signal).

Capacitor 120 may be on-chip along with resistors 108 and 110 or may be off-chip, with line 116 coupling to capacitor 120 through an input/output pad, pin, or terminal. Capacitor 120 may also represent the capacitance of line 116, as described in further detail herein, with line 116 utilizing the techniques described herein to provide sufficient capacitance for common mode termination.

Driver 102 may also have a source termination to, for example, provide proper line impedance matching and reduce reflected signals due to system impedance mismatches. The source termination is provided by resistors 122 and 124 that are programmably coupled across lines 106 via switches 126, as described similarly for resistors 108 and 110. Likewise, a line 130 programmably couples a common mode node 128 to ground to provide common mode termination via a switch 132 and a capacitor 134 (similar to line 116).

DS system 100 is shown as a unidirectional point-to-point link and, therefore, a second DS system 100 would be required to provide, in combination, data in both directions. DS system 100 is not limited, however, to this one type of configuration. Various other device or system configurations are possible, such as for example bi-directional half-duplex, multidrop, multipoint, and/or the incorporation of a data distribution buffer, a repeater, or a crosspoint switch.

Figure 2:
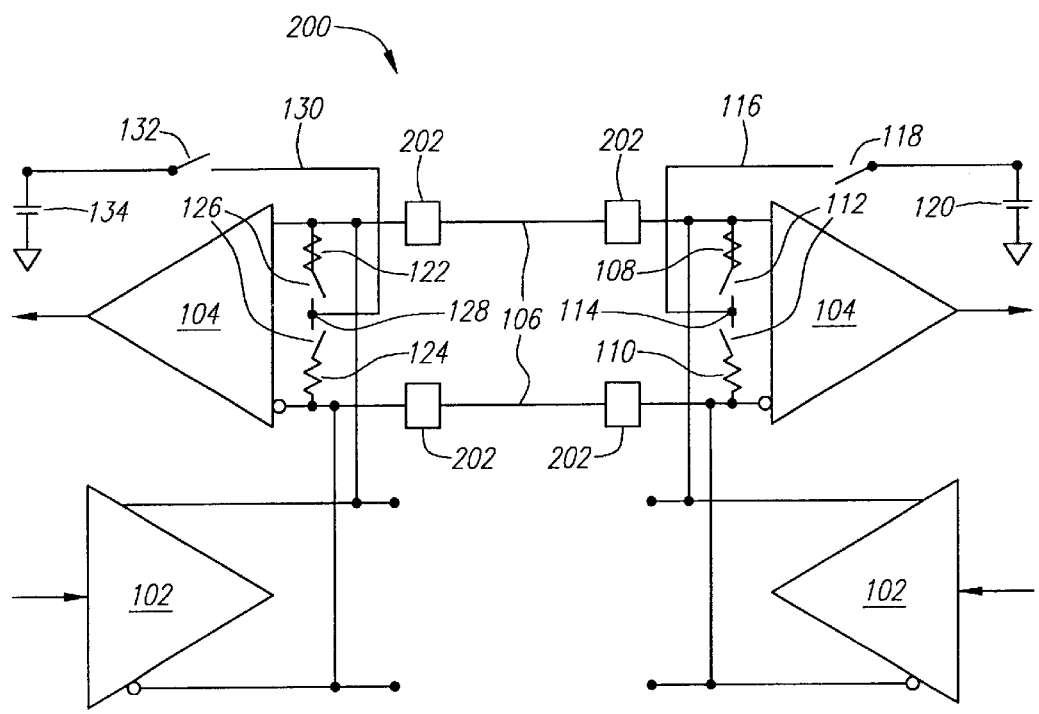
FIG. 2 shows a circuit schematic illustrating a differential signaling system in accordance with an embodiment of the present invention.

For example; FIG. 2 shows a circuit schematic illustrating a differential signaling (DS) system 200 in accordance with an embodiment of the present invention. DS system 200 provides bi-directional half-duplex communication across lines 106 (through pads 202) using a pair of input/output circuits at each end, represented by driver 102 and receiver 104. Therefore, if driver 102 (i.e., the local output circuit) at one end is transmitting, then receiver 104 (i.e., the remote input circuit) is operating to receive the transmitted information at the other end. For a given end, either driver 102 or receiver 104 is operating to transfer information at any given time. Lines 116 and 130 provide common mode termination for DS system 200, as discussed similarly for DS system 100.

Figure 3:
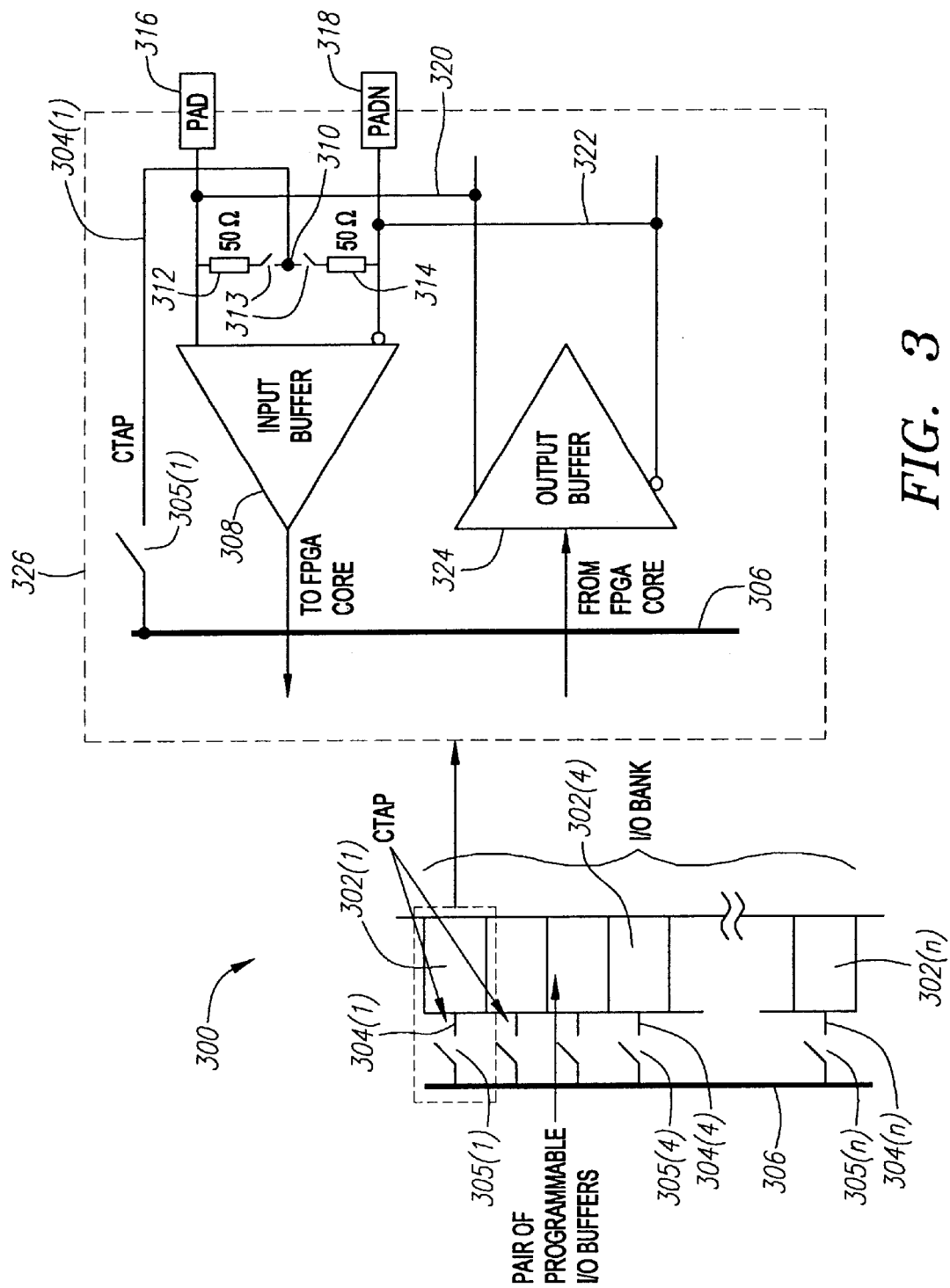
FIG. 3 shows a circuit schematic illustrating a differential signaling system in accordance with an embodiment of the present invention.

FIG. 3 shows a circuit schematic illustrating a differential signaling (DS) system 300 in accordance with an embodiment of the present invention. DS system 300 includes a number of input/output circuits 302 (which are separately referenced as 302(1) through 302(n), where "n" represents the number of input/output circuits 302) that may be grouped together, such as to form a bank of input/output circuits. Input/output circuits 302 are provided with a common mode termination through corresponding lines 304 (which are separately referenced as 304(1) through 304(n) and labeled CTAP to indicate center tap termination lines) and a bus 306. The common mode termination may be programmable by employing switches 305 (which are separately referenced as 305(1) through 305(n)) corresponding to lines 304(1) through 304(n).

DS system 300, for example, may be used to form a bank of programmable differential signaling input/output buffers having a programmable common mode (i.e., center tap) termination. DS system 300 may be implemented in various electrical devices or chips, such as in programmable logic devices (e.g., complex programmable logic devices or field programmable gate arrays).

Bus 306 may extend along the entire bank or a portion of the bank of input/output circuits 302. Bus 306 may couple with an on-chip capacitor or an off-chip capacitor (not shown) through an input/output pad or pin to provide a path to ground for the common mode signals. Furthermore, as explained in further detail herein, bus 306 and/or line 304 by itself may provide sufficient capacitance and provide a path to ground for the common mode signals.

Each input/output circuit 302 includes one or more buffers, which may be programmable and provide differential signaling or some other type of signaling (e.g., single-ended signaling). As an example, each input/output circuit 302 may include a pair of programmable input/output buffers that may utilize a programmable common mode (center tap) termination.

In FIG. 3, an expanded view of a portion of DS system 300 is shown to illustrate an exemplary circuit 326 for one or more of input/output circuits 302, such as for example for input/output circuit 302(1) along with line 304(1) and a portion of bus 306 (i.e., as indicated by a dashed line encompassing input/output circuit 302(1), line 304(1), and a portion of bus 306). Circuit 326 includes an input buffer 308 and an output buffer 324, which are coupled together by lines 320 and 322 to share pads 316 and 318 (labeled pad and padn to represent pad and pad NOT or corresponding true and complement input/output pads).

Output buffer 324 receives information from within its associated device (not shown) for transmission out of the device (e.g., an integrated circuit or chip) through pads 316 and 318. Input buffer 308 receives external information (i.e., information from outside of the associated device) through pads 316 and 318 for transfer within the associated device of input buffer 308, as indicated in circuit 326. For example, circuit 326 may be utilized as part of DS system 300 that is within a programmable device (e.g., a field programmable gate array) to transfer information (e.g., data) to and from the programmable device.

Input buffer 308 and output buffer 324 (as well as driver 102 and receiver 104 of FIGS. 1 and 2) may represent conventional differential signaling buffers, programmable (e.g., such as for programmable devices) or non-programmable (e.g., such as for application specific integrated circuits), as is known in the art. Alternatively, output buffer 324 may represent a programmable buffer that is capable of supporting various types of differential signaling specifications or standards, such as for example as disclosed in U.S. patent application Ser. No. 10/266,361 entitled "Low Voltage Differential Signaling Systems and Methods" and filed Oct. 7, 2002 by Arifur Rahman, which is incorporated by reference herein in its entirety.

Input buffer 308 has resistors 312 and 314 programmably coupled across its input leads (i.e., the leads between pads 316 and 318 and input buffer 308). Resistors 312 and 314 are programmably coupled across the input leads by utilizing switches 313 (e.g., a transistor having its base or gate controlled by a programmable memory cell, such as a static random access memory cell, or other type of control signal, which may also be applicable for various switches discussed herein) to provide matching differential impedance for the transmission medium (not shown) that is provided between input buffer 308 and a remote transmitter (e.g., a remote output buffer on a remote device). Resistors 312 and 314 may, for example, each have a resistance of 50 Ω to provide a total of 100 Ω of matching differential impedance or the resistance may be of any value desired to provide the proper load resistance and/or impedance matching.

Input buffer 308 and output buffer 324 share pads 316 and 318 and operate in a half-duplex fashion, such that information is not being received by input buffer 308 while output buffer 324 is transmitting information. Resistors 312 and 314 provide a load resistor for input buffer 308 so that input buffer 308 can measure a differential voltage across resistors 312 and 314. Output buffer 324 may also use resistors 312 and 314 to provide a source termination to, for example, provide proper line impedance matching and reduce reflected signals due to system impedance mismatches (e.g., between circuit 326 and a remote device across the transmission medium). Alternatively, switches 313 may be utilized to disconnect resistors 312 and 314 so that source termination is not provided.

Between resistors 312 and 314 is a common mode node 310. Line 304(1) is coupled to common mode node 310 to provide a common mode termination path through bus 306. The common mode termination path may be programmable by inserting a switch 305(1) (e.g., similar to switches 313) to programmably couple line 304(1) to bus 306. Consequently, if common mode termination is desired, common mode node 310 can be coupled (e.g., alternating current (AC) coupled) to ground using an on-chip or off-chip capacitor or by using the capacitance of bus 306 and/or line 304(1). For example, one or more on-chip capacitors may be coupled to bus 306 or one or more off-chip capacitors may be coupled to bus 306 through one or more corresponding dedicated input/output pads or terminals for common mode termination.

Resistors 312 and 314 may also represent one resistor having a center tap node, with approximately equal resistance or variable resistance on each side of the center tap node. Line 304(1) would then couple to the center tap node. Switches 313 would be positioned on each end of the resistor to programmably couple it to the input leads of input buffer 308.

Bus 306 and lines 304 provide a path to ground for common mode signals of associated input/output circuits 302. Bus 306 and each of lines 304 (i.e., line 304(1), line 304(2), . . . , and line 304(n)) may represent one line or path or multiple lines or paths. For example, bus 306 may provide two lines or paths for input/output circuits 302, one for the input buffers and one for the output buffers. Furthermore, each of lines 304 may provide two lines or paths for input/output circuits 302, one to couple the input buffers to the associated first line of bus 306 and one to couple the output buffers to the associated second line of bus 306.

Figure 4:
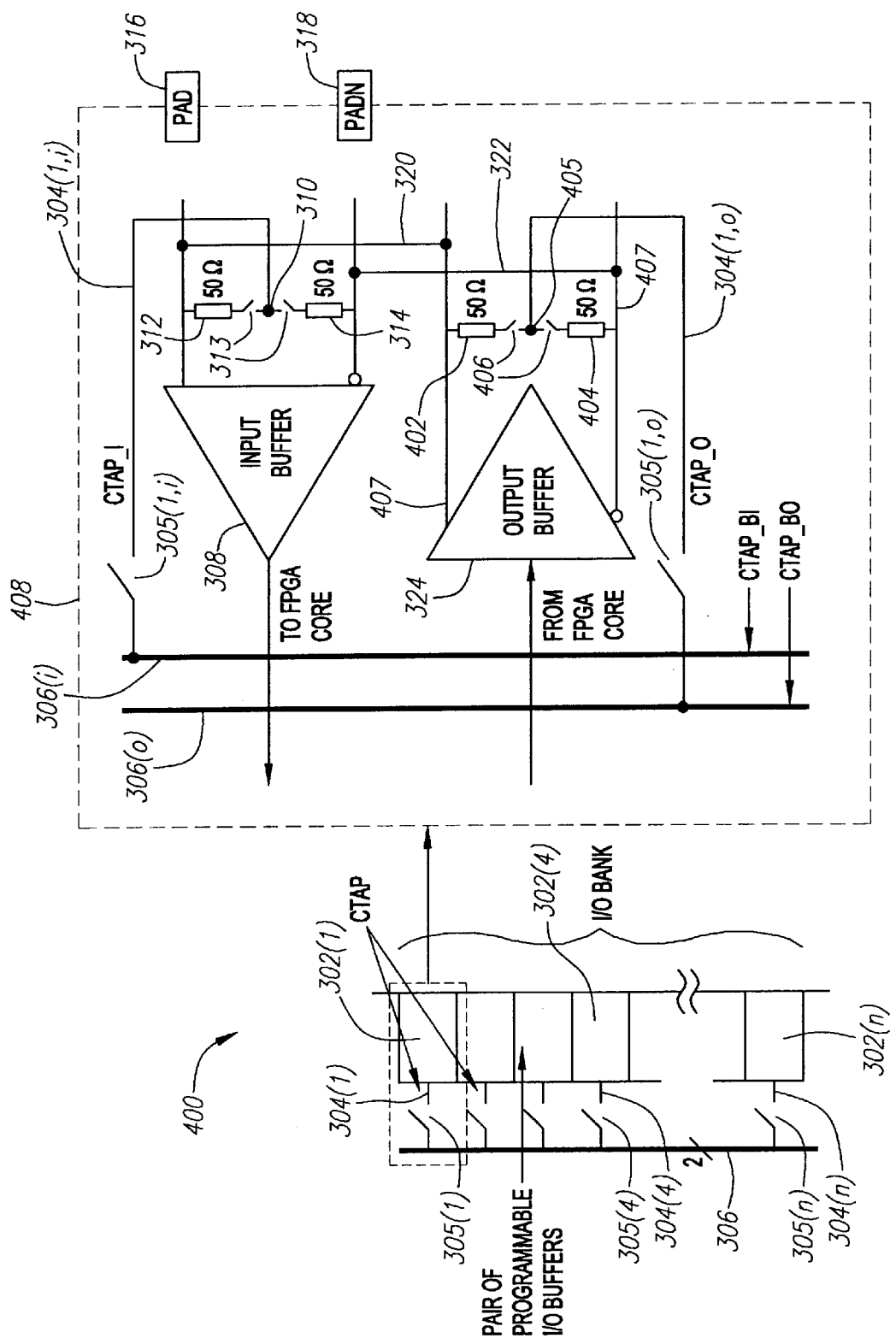
FIG. 4 shows a circuit schematic illustrating a differential signaling system in accordance with an embodiment of the present invention.

FIG. 4 shows a circuit schematic illustrating a differential signaling (DS) system 400 in accordance with an embodiment of the present invention. DS system 400 is similar to DS system 300 (FIG. 3), but illustrates the above example of two paths for bus 306 and each of lines 304. As such, only certain differences of DS system 400 as compared to DS system 300 will be discussed rather than repeating the discussion for similar or identical functions or operations.

In FIG. 4, an expanded view of a portion of DS system 400 is shown to illustrate an exemplary circuit 408 for one or more of input/output circuits 302, such as for example for input/output circuit 302(1) along with line 304(1) and a portion of bus 306 (as indicated in FIG. 4 by the dashed line encompassing these elements). Circuit 408 includes input buffer 308 and output buffer 324, which are coupled together by lines 320 and 322 to share pads 316 and 318.

Input buffer 308 has resistors 312 and 314 programmably coupled across its input leads to provide a load resistance for input buffer 308 and matching differential impedance for the transmission medium. Output buffer 324 has resistors 402 and 404 programmably coupled across its input leads 407 to provide, if necessary for example, a source termination for proper line impedance matching and to reduce reflected signals due to impedance mismatches. Resistors 312, 314, 402, and 404 may each have a resistance of 50 Ω or any other value as necessary, depending upon the application and system requirements.

Switches 313 and 406 may be used to decouple resistors 312, 314, 402, and 404 if source termination for output buffer 324 is not required. If source termination is desired, switches 313 would decouple resistors 312 and 314 from across the input leads of input buffer 308 while switches 406 would couple resistors 402 and 404 across input leads 407.

It should be noted that input buffer 308 and output buffer 324 do not have to share pads 316 and 318. For example, lines 320 and 322 may be eliminated and separate pads provided for output buffer 324 at corresponding input leads 407. Consequently, circuit 408 would require two unidirectional information channels (one channel coupled to pads 316 and 318 and one channel coupled to pads associated with output buffer 324) rather than one bidirectional half-duplex information channel coupled to pads 316 and 318. Furthermore, input buffer 308 and output buffer 324 may be configurable as single-ended buffers (with switches 313 and 406 decoupling their associated resistors) or as differential buffers.

As shown in circuit 408, line 304(1) includes a line 304(1,i) and a line 304(1,o) that are associated with input buffer 308 and output buffer 324, respectively. Also, bus 306 includes a bus 306(i) and a bus 306(o) that are associated with line 304(1,i) and line 304(1,o), respectively.

Line 304(1,i), which is labeled CTAP_I to indicate that it helps to provide an input center tap termination, is coupled to bus 306(i), which is labeled CTAP_BI to indicate that it helps to provide an input center tap termination bus, to provide a common mode termination path from common mode node 310 for input buffer 308. The common mode termination path may be programmable by inserting a switch 305(1,i) to programmably couple line 304(1,i) to bus 306(i). Consequently, if common mode termination is desired, common mode node 310 can be coupled (e.g., alternating current (AC) coupled) to ground using an on-chip or off-chip capacitor or by using the capacitance of bus 306(i) and/or line 304(1,i).

Line 304(1,o), which is labeled CTAP_O to indicate that it helps to provide an output center tap termination, is coupled to bus 306(o), which is labeled CTAP_BO to indicate that it helps to provide an output center tap termination bus, to provide a common mode termination path from a common mode node 405 for output buffer 324. The common mode termination path may be programmable by inserting a switch 305(1,o) to programmably couple line 304(1,o) to bus 306(o). Consequently, if common mode termination is desired, common mode node 405 can be coupled to ground using an on-chip or off-chip capacitor or by using the capacitance of bus 306(o) and/or line 304(1,o).

Figure 5:
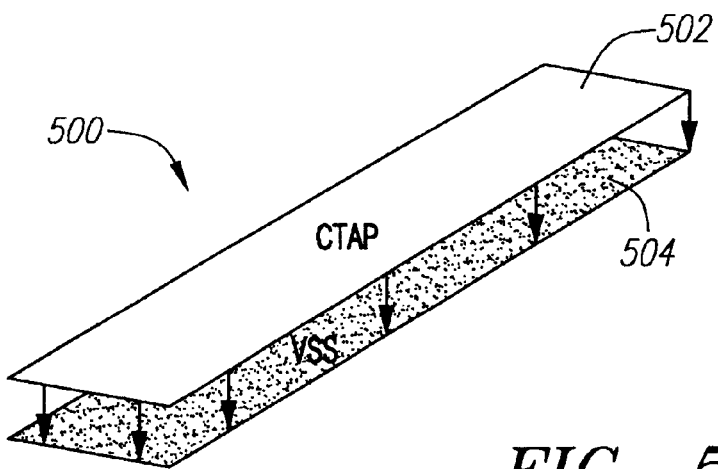
FIG. 5 shows an exemplary structure for a common bus to provide on-chip capacitance in accordance with an embodiment of the present invention.
Figure 6:
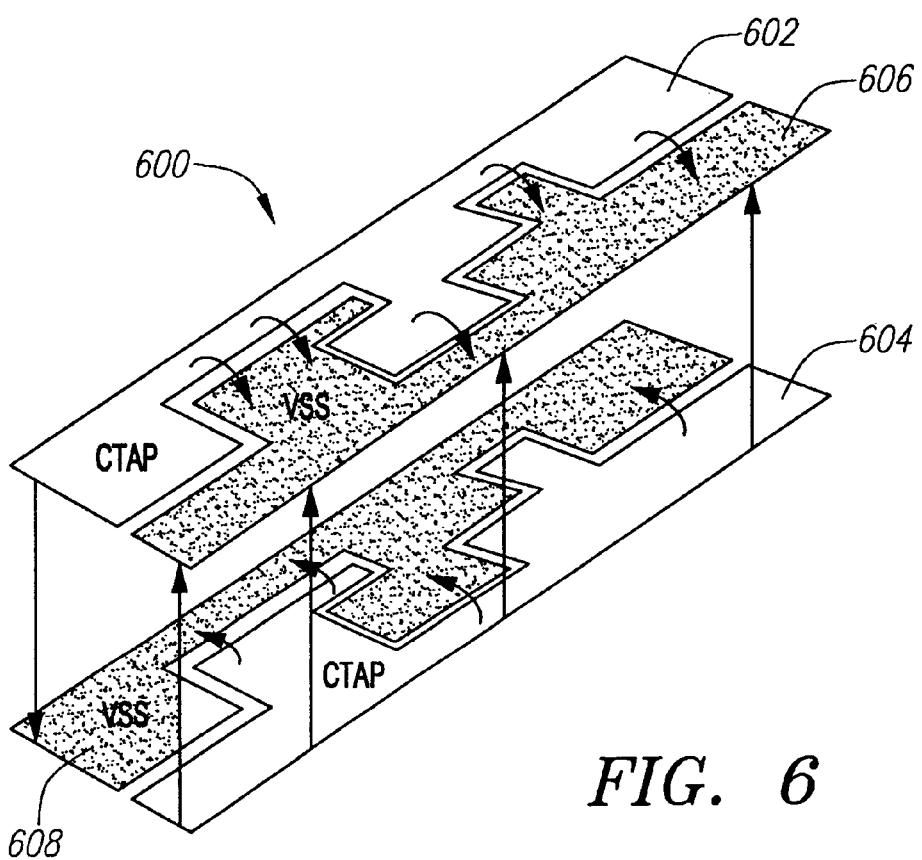
FIG. 6 shows an exemplary structure for a common bus to provide on-chip capacitance in accordance with an embodiment of the present invention.

As noted above in reference to FIGS. 1 through 4, the line or bus coupled to the common mode node may provide the necessary capacitance and provide a path to ground. Specifically, rather than couple the common mode node to an off-chip capacitor or an on-chip capacitor, the line or bus (e.g., line 116 and/or line 130 of FIG. 1, line 304 and/or bus 306 of FIGS. 3 and 4) coupling the common mode node to ground may be designed, in accordance with an embodiment of the present invention, to provide the desired capacitance. FIGS. 5 and 6 show exemplary embodiments to illustrate this technique.

FIG. 5 shows an exemplary structure for a line 500 to provide on-chip capacitance in accordance with an embodiment of the present invention. Line 500 includes a line 502 and a line 504. Line 502 carries the common mode signals while line 504 serves as a ground plane (labeled VSS to indicate ground voltage). Thus, by positioning line 502 in close proximity to line 504, lines 502 and 504 form a parallel plate capacitor, with the arrows in FIG. 5 indicating the direction of the electric field lines.

FIG. 6 shows another exemplary structure for a line 600 to provide on-chip capacitance in accordance with an embodiment of the present invention. Line 600 includes lines 602, 604, 606, and 608.

Lines 602 and 604 carry the common mode signals while lines 606 and 608 serve as a ground plane (labeled VSS to indicate ground voltage).

As shown, line 602 and line 606 are positioned in close proximity, such as on the same metal layer or plane, and are also positioned in close proximity to line 604 and 608, which are also positioned in close proximity to each other, such as on another metal layer or plane. Note that the separation between lines 602 and 608 and between lines 604 and 606 has been exaggerated for illustration purposes and would generally be in much closer proximity to each other. Thus, lines 602, 604, 606, and 608 form a parallel plate capacitor, with the arrows in FIG. 6 indicating the direction of the electric field lines.

Line 600 may provide a higher capacitance density as compared to line 500 due to line 600 utilizing not only vertical flux but also lateral flux. By utilizing fractal geometry, line 600 increases the capacitance density by exploiting lateral fringing fields between lines 602 and 606 and also between lines 604 and 608. Consequently, electric fields are generated not only in the vertical direction between line 602 and line 608 and between line 604 and line 606, but also between line 602 and line 606 and between line 604 and line 608.

For example, in sub-micron technology, the coupling capacitance between two neighboring lines (e.g., wires or printed circuit board traces) on the same plane may be quite significant. Utilizing fractal geometry, the contribution of lateral/coupling capacitance can be increased and thus line 600 offers a higher capacitance per unit area as compared to line 500 of FIG. 5. The amount of capacitance per unit area for line 600 may be determined based on the dimension of the fractal, with larger fractal dimensions providing a larger amount of capacitance per unit area, and also on the length of the line. Thus, the shape and dimensions of line 600 can be chosen to maximize its capacitance (or provide the desired capacitance) and, using fractal geometry, take advantage of vertical and lateral capacitance to utilize the sidewall capacitance and/or multiple levels of metal layers.

As described in accordance with one or more embodiments of the present invention, bank-based programmable common mode termination for differential input/output buffers is provided. For example, programmable AC coupled common mode termination may be implemented for bank-based input/output buffers in programmable devices (e.g., field programmable gate arrays) and may also be implemented for bank-based input/output buffers in application specific integrated circuits (ASICs). The common mode termination provides AC coupling to ground by utilizing an on-chip capacitor, an off-chip capacitor, or by designing the common mode termination bus to have sufficient intrinsic capacitance. Consequently, by utilizing design techniques discussed herein, certain advantages may be achieved with respect to signal integrity, flexibility, and a reduction in input/output overhead for the common mode termination.

Embodiments described above illustrate but do not limit the invention. It should also be understood that numerous modifications and variations are possible in accordance with the principles of the present invention. Accordingly, the scope of the invention is defined only by the following claims.

We claim:

1. An input/output circuit bank comprising:
   a plurality of input circuits each having input leads adapted to couple to a corresponding transmission channel;
   a plurality of output circuits, with each of the output circuits coupled to the input leads of a corresponding one of the input circuits to share the transmission channel;
   a plurality of resistor pairs, each of the resistor pairs coupled across the input leads of a corresponding one of the input circuits;
   a common mode node coupled to each of the resistor pairs; and
   a bus coupled to the common mode nodes and adapted to provide a common mode termination for the input circuits.

2. The input/output circuit bank of claim 1, wherein the bus is programmably coupled to each of the common mode nodes.

3. The input/output circuit bank of claim 1, wherein the bus couples the common mode nodes to at least one capacitor which provides a path to ground for common mode signals.

4. The input/output circuit bank of claim 1, wherein the bus is adapted to provide sufficient capacitance and a path to ground for common mode signals.

5. The input/output circuit bank of claim 4, wherein the bus provides the capacitance required using fractal geometry to generate vertical and lateral electrical fields.

6. The input/output circuit bank of claim 1, wherein the resistor pairs are programmably coupled across the input leads.

7. The input/output circuit bank of claim 1, further comprising:
   a plurality of second resistor pairs, with each of the resistor pairs coupled across input leads of a corresponding one of the output circuits;
   a second common mode node coupled to each of the second resistor pairs; and
   a second bus coupled to the second common mode nodes and adapted to provide a common mode termination for the output circuits.

8. The input/output circuit bank of claim 7, wherein the second bus is programmably coupled to each of the second common mode nodes, and the second resistor pairs are programmably coupled across the input leads of the output circuits.

9. The input/output circuit bank of claim 7, wherein the second bus couples the second common mode nodes to at least one capacitor which provides a path to ground for common mode signals.

10. The input/output circuit bank of claim 7, wherein the second bus is adapted to provide sufficient capacitance and a path to ground for common mode signals.

11. The input/output circuit bank of claim 10, wherein the second bus provides the capacitance required using fractal geometry to generate vertical and lateral electrical fields.

12. An input circuit comprising:

an input buffer having input leads;

means for programmably coupling a load across the input leads; and means for providing a programmable common mode termination at the load to provide a path to ground for common mode signals.

13. The input circuit of claim 12, wherein the input circuit is paired with an output circuit to form an input/output circuit.

14. The input circuit of claim 13, wherein the output circuit is coupled to the input leads of the input circuit to share a transmission channel.

15. The input circuit of claim 13, wherein the input/output circuit is formed as part of a bank of input/output circuits and the means for providing a programmable common mode termination for each of the input/output circuits shares at least one common bus.

16. A method of providing a common mode termination for a bank of input/output circuits, the method comprising:

providing a load across input leads of each of the input circuits within the bank;

inserting a common mode node between the input leads of each of the input circuits within the bank; and coupling the common mode node for each of the input circuits to a bus which provides a common mode termination path for common mode signals associated with the input circuits.

17. The method of claim 16, further comprising:

providing a second load across output leads of each of the output circuits within the bank;

inserting a second common mode node between the output leads of each of the output circuits within the bank; and coupling the second common mode node for each of the output circuits to a second bus which provides a second common mode termination path for common mode signals associated with the output circuits.

18. The method of claim 17, wherein the load across the input leads and the second load across the output leads is programmable.

19. The method of claim 18, wherein the bus and the second bus are programmably coupled to the common mode nodes and the second common mode nodes, respectively.

20. An input/output circuit bank comprising:

a plurality of input/output circuits;

at least one bus adapted to provide a path to ground for common mode signals; and means for coupling the at least one bus to the plurality of input/output circuits.

21. The input/output circuit bank of claim 20, further comprising a capacitor coupled to the at least one bus to provide a path to ground for the common mode signals.

22. The input/output circuit bank of claim 20, wherein the coupling means is programmable.

* * * * *